Sept. 24, 1968   M. F. PEDEN ET AL   3,402,682

DIE-HEAD FOR PRODUCING HOLLOW PARTICLES

Filed Oct. 4, 1966

INVENTORS
MERLE F. PEDEN
LA VERNE M. ODDEN

BY Harold D. Jastram

ATTORNEY

United States Patent Office 3,402,682
Patented Sept. 24, 1968

3,402,682
DIE-HEAD FOR PRODUCING
HOLLOW PARTICLES
Merle F. Peden, Minneapolis, and La Verne M. Odden,
Wayzata, Minn., assignors to General Mills, Inc., a
corporation of Delaware
Filed Oct. 4, 1966, Ser. No. 584,205
5 Claims. (Cl. 107—14)

ABSTRACT OF THE DISCLOSURE

An extrusion die-head for attachment to a screw extruder. The die-head having passages for producing an extruded hollow tube with a web like inter structure. The die-head has chambers designed to equalize the pressures applied to the extruded material to insure uniform rate of flow of the product at the extrusion face of the die.

The present invention relates to a die-head for the manufacture of irregularly shaped food products and more particularly to a die-head for the manufacture of shaped food products having the shape of a hollow tube.

In the manufacture of food products having a plastic consistency, or in the manufacture of plastic tubes, problems have been encountered in maintaining a tubular shape of an extruded rope of the food product when the rope is permitted to extrude for substantial length before being cut by a cutting knife. Frequently, an extruded food product must be permitted to temper or set prior to cutting of the product because as the food product is extruded from the extruder head, the product will tend to smear the cutting knife or the tube-like product will collapse due to the high temperatures or high moisture content used in the extruded dough. The extruded rope of hollow material is very weak and consequently requires extremely careful handling. For this reason, it is desirable to permit this rope to temper or cure or become set so that it becomes more tough and therefore more workable with cutting knives and the like. Permitting the rope to extrude for extended lengths to accomplish this curing or setting causes a further problem in the processing of the rope provided the manufacturer is interested in maintaining a predetermined shape of the product. It has been found that if the rope is permitted to extend more than a few feet from the end of the die, the hollow rope will create a vacuum within the rope with the result that outside atmospheric pressure wil collapse the weak, hollow rope. Naturally, this destroys the decorative cross sectional shape of the product when it is finally hard enough to be cut. In a simple tube, this means that the tube will be collapsed by the atmospheric pressure surrounding the tube before the tube achieves sufficient toughness and rigidity to resist the atmospheric pressure. As previously noted, a method of avoiding this destruction of the shape of the rope by atmospheric pressure is accomplished by severing the rope very close to the die. This procedure, however, encounters the first stated problem, namely that of difficult cutting and handling of the dough rope.

It is therefore an object of the present invention to provide a new and improved die-head for extruding hollow ropes of plastic material.

It is a further object of the present invention to provide a new and improved die-head for extruding hollow ropes of plastic material which are not collapsed by atmospheric pressure.

It is a further object of the present invention to provide a new and improved die-head for extruding hollow ropes of food product wherein the pressure within the hollow ropes is maintained at the pressure surrounding the outer surface of the rope.

A die-head incorporating certain features of the invention includes a core mounted within a die to define an irregularly shaped extrusion outlet. The core contains an air channel which communicates with an enclosed hollow area in the extruded strand or rope so that atmospheric pressure is maintained within the strand to equalize the external atmospheric pressure throughout the extrusion operation and thereafter until the product is cut by knives.

A more complete understanding of the invention can be obtained by reference to the specification and the drawings in which.

Figure 3:
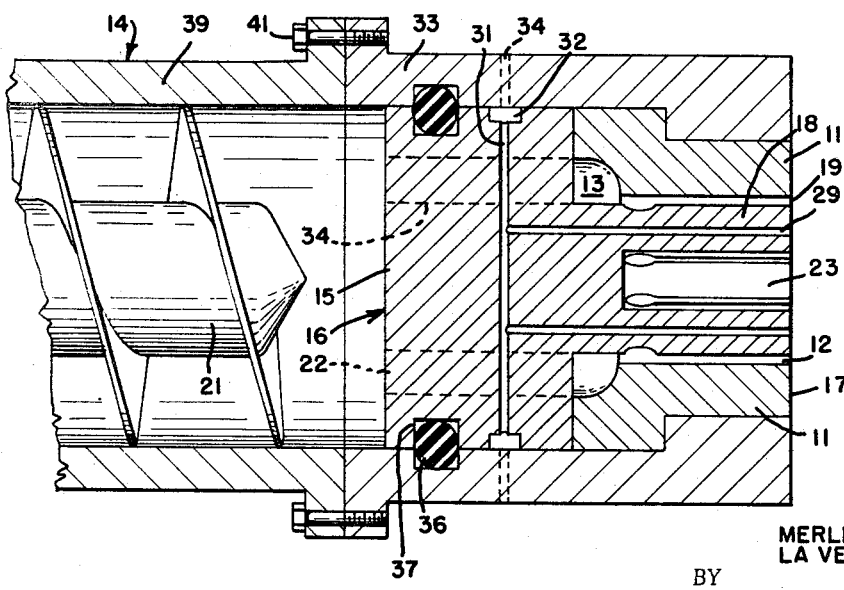
FIGURE 3 is a cross sectional view taken along lines 3—3 of FIGURE 1.

Refer first to FIGURE 3 of the drawings. A die 11 is provided with a passage 12 having an annular chamber 13. The passage 12 extends throughout the die 11 and includes the annular chamber 13 which is an enlargement of the passage 12. The annular chamber 13 is located in passage 12 at the surface of the die 11 nearest an extruder auger 14. The shape of passage 12 will be governed by the resulting shape desired of the extruded product and by the shape of a core 16 which extends throughout the length of the passage 12 and terminates at the die face 17.

Figure 2:
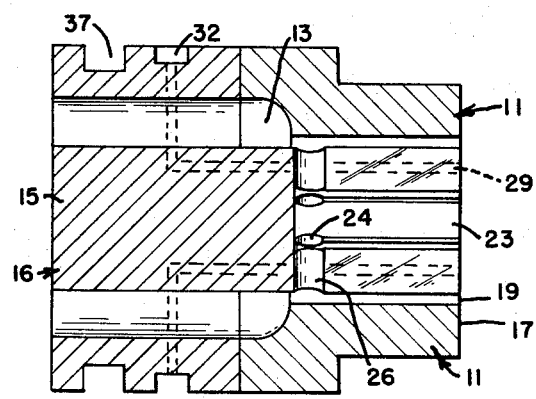
FIGURE 2 is a cross sectional view taken along lines 2—2 of FIGURE 1.

Core 16 consists of a flanged portion 15 and a central portion 18. The central portion 18 is fully within the passage 12 of the die 11 and defines the extrusion outlet 19. The flanged portion 15 of the core 16 contains a number of product passages 22 which interconnect the annular chamber 13 with the extruder 14. The screw 21 forces the food product or similar materials into the passages 22 and ultimately into annular chamber 13. The product passage continues through the central portion 18 of said core 16. This is illustrated in FIGURE 2 of the drawings where the passage is designated as central passage 23. The passage 23 communicates with passage 12 by way of connecting passages 24 located in the central portion 18 of the core 16 adjacent the flanged portion 15.

Figure 1:
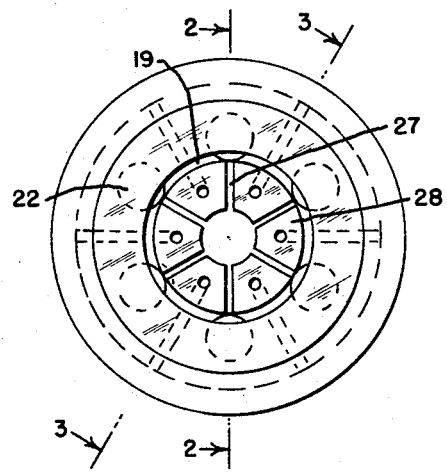
FIGURE 1 is a front view of a die-head according to the invention.

As will be observed in FIGURE 2 of the drawings, a preferred embodiment of the invention incorporates a groove 26 adjacent the connection of the flanged portion 15 and the central portion 18 to provide a reservoir of material and to equal pressure so that material flows uniformly through central passage 23, passages 12 and through radial passages 27 illustrated in FIGURE 1 of the drawings. Radial passages 27 extend from passage 12 to central passage 23 and provide a configuration whereby the extruded product consists of a number of enclosed areas 28 within each extruded rope or product illustrated in FIGURE 1 of the drawings.

The enclosed area 28 is similar to a closed cylinder in that there is only an opening at the lead end of the extruded rope. As previously noted, when the rope extruded from the die-head is permitted to set and cool as desired, the atmospheric pressure bearing upon the extruded product will collapse the rope because a vacuum is created in the enclosed areas 28. Consequently, air channels 29 are provided in the core 16 which equalize the atmospheric pressure of the outside of the rope and the atmospheric pressure on the inside of the rope, the inside of the rope corresponding to enclosed areas 28.

Reference to FIGURE 3 of the drawings will reveal that the air channels 29 extend throughout the central portion 18 of the core and communicate with an air channel 31 in the flanged portion 15 of the core 16. The air channel 31 in turn communicates with an air groove 32 through which air from atmosphere is directed to the enclosed areas 28 of the rope. There is a plurality of air channels 29 corresponding to the number of enclosed areas 28 of the central portion of the core. The die 11 and the core 16 are mounted within a housing 33 through which channels 34 have been drilled to permit air at atmospheric pressure to enter the air grooves 32.

Thus it can be seen that as the rope is extruded from the extrusion outlet 19 and as the rope forms a vacuum within each of the enclosed areas 28 thereof, the vacuum created will generate air movement through the various air channels into the enclosed area 28. The pressure within each of the enclosed areas 28 is equalized at atmospheric pressure. Consequently, the newly extruded rope which is quite weak and difficult to handle will not be crushed by the outside atmospheric pressure.

A rubber seal 36, preferably annular in shape, is inserted within groove 37 in flange portion 15 to prevent the flow of product from the auger 14 between the flange surface and the housing 33. The housing is in turn connected to the housing 39 of the auger 14 by bolts 41.

Thus it will be observed that product is forced from the extruder through the passages 22 into an annular chamber 13 which insures an adequate supply of product to all areas of the central portion 18 of core 16. The product flows into passage 12 and also into connecting passages 24 and radial passages 27 to enter passage 23 where the product finally exits at the extrusion outlet at the die face at a uniform pressure. The groove 26 acts as a product reservoir insuring an adequate supply of product to connecting passages 24. The resulting product is a rope containing a number of enclosed areas 28 which, when cut in cross section by a suitable cutting knife, will provide a decorative shaped food product. The vacuum created by the continuous extrusion of the food product is equalized by air flow through the air channels described above which thereby permits the rope to be extended for many, many feet while it is being cured, cooled, dried, or otherwise toughened for subsequent processing.

It is to be understood that the above-described specific embodiment is very illustrative of the principles of the invention and other embodiments may be devised by those skilled in the art which fall within the spirit and scope of the invention.

The embodiments of the invention in which an exclusive property or privilege is claimed are defined as follows:

1. A die-head for the manufacture of shaped food products which comprises a die having a first extrusion passage, a core mounted in said first passage with a central portion of said core extending throughout said first passage, said core having a flange portion extending beyond said first passage and engaging said die, said core having a second passage extending throughout the length of said core in communication with said first passage to define an extrusion outlet having a plurality of enclosed areas, said die having an annular chamber in said first passage opposite said extrusion outlet, said core having a plurality of product passages in the flange portion each of which terminates at the annular chamber of said die, a housing in which said die and core are mounted, said core having an air distributing groove in the flange portion thereof which is associated with said housing, said core having a plurality of air channels corresponding in number to the number of said enclosed areas at said extrusion outlet, each of said air channels extending through said core from a respective enclosed area to the air groove in said flange portion, and said housing having an air channel communicating with said air groove.

2. A die-head in accordance with claim 1 which further includes a seal mounted between said flange and said housing to prevent product flow between the flange and housing.

3. A die-head in accordance with claim 1 in which the central portion of said core has an annular groove adjacent said flange portion, said annular groove forming an annular chamber communicating with the annular chamber in said first passage and communicating with said second passage.

4. A die-head in accordance with claim 3 in which the first and second passages communicate to define an extrusion outlet which is a solid cylinder within a circle and interconnected at spaced intervals by bars formed by radial passages in the central portion of said core, the circle being formed by the central portion of said core and said first passage and the cylinder shape being centrally located within said central portion.

5. A die-head in accordance with claim 4 in which the central portion of said core has individual passages interconnecting said annular groove with a respective radial passage.

References Cited

UNITED STATES PATENTS

| | | | |
|---|---|---|---|
| 1,556,617 | 10/1925 | Laskey | 107—14 XR |
| 2,199,825 | 5/1940 | Kretchmer | 107—14 |
| 2,703,434 | 3/1955 | Allan et al. | 25—17 XR |
| 3,357,051 | 12/1967 | Zolotarevsky | 25—17 XR |

FOREIGN PATENTS 635,978  3/1962  Italy.

WALTER A. SCHEEL, Primary Examiner.
ARTHUR O. HENDERSON, Assistant Examiner.